(12) United States Patent
Hirayama et al.

(10) Patent No.: US 7,546,818 B2
(45) Date of Patent: Jun. 16, 2009

(54) INTERNAL COMBUSTION ENGINE WITH WIND EXHAUST DUCT AND VEHICLE MOUNTED WITH INTERNAL COMBUSTION ENGINE

(75) Inventors: Shuji Hirayama, Saitama (JP); Masato Takamuro, Saitama (JP); Yuichiro Morikawa, Saitama (JP); Masashi Kanezuka, Saitama (JP); Takehiro Koyasu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 84 days.

(21) Appl. No.: 11/898,897

(22) Filed: Sep. 17, 2007

(65) Prior Publication Data
US 2008/0066698 A1 Mar. 20, 2008

(30) Foreign Application Priority Data
Sep. 20, 2006 (JP) ............................. 2006-254952
Jun. 20, 2007 (JP) ............................. 2007-162947

(51) Int. Cl.
*F01P 9/00* (2006.01)
*F02B 75/22* (2006.01)

(52) U.S. Cl. ............................. 123/41.01; 123/195 R; 180/68.1

(58) Field of Classification Search ............. 123/41.01, 123/41.48, 41.49, 195 R, 195 C, 195 AC, 123/195 HC; 180/68.1, 68.4
See application file for complete search history.

(56) References Cited

U.S. PATENT DOCUMENTS
2002/0112680 A1   8/2002   Oki et al.

FOREIGN PATENT DOCUMENTS
| JP | 2000-62669 A | 2/2000 |
| JP | 2001-130469 A | 5/2001 |
| JP | 2002-129960 A | 5/2002 |
| JP | 2006183488 A | * 7/2006 |

* cited by examiner

*Primary Examiner*—Noah Kamen
(74) *Attorney, Agent, or Firm*—Birch, Stewart, Kolasch & Birch, LLP

(57) ABSTRACT

To increase the wind volume of the cooling wind flowing through a radiator and to enhance the cooling performance of the radiator by providing a wind exhaust duct using a crankcase of an internal combustion engine. A cooling device of the internal combustion engine includes a radiator arranged lateral to crankcases. A wind exhaust duct exhausts the cooling wind passed through the radiator to the atmosphere. The wind exhaust duct is extends along a rotational axis of the crankshaft at the upper portion of the crankcases and the upper portion of the transmission case.

15 Claims, 10 Drawing Sheets

LEFT ←——→ RIGHT

DIRECTION OF ROTATIONAL AXIS

INTERNAL COMBUSTION ENGINE WITH WIND EXHAUST DUCT AND VEHICLE MOUNTED WITH INTERNAL COMBUSTION ENGINE

CROSS-REFERENCE TO RELATED APPLICATIONS

This nonprovisional application claims priority under 35 U.S.C. § 119(a) on Patent Application Nos. 2006-254952 and 2007-162947, filed in Japan on Sep. 20, 2006 and Jun. 20, 2007, respectively. The entirety of each of the above applications is incorporated herein by reference.

BACKGROUND OF THE INVENTION

1. Field of the Invention

The present invention relates to an internal combustion engine that includes an engine main body configured by a crankcase and a cooling device equipped with a radiator cooled by cooling wind. The present invention also relates to a vehicle on which the internal combustion engine is mounted.

2. Background of the Invention

A cooling device of an internal combustion engine that includes a radiator cooled by the cooling wind is known from, for example, JP-A No. 2002-129960. In this known cooling device, a wind outlet portion for exhausting cooling wind that has passed through the radiator to the atmosphere is formed in a cylindrical shroud, coupled to the crankcase, for holding the radiator.

In order to enhance the cooling performance of the cooling water from the radiator, a radiator core of the radiator may be enlarged or a cooling fan may be enlarged to increase the wind volume of the cooling wind that passes through the radiator. However, this leads to an enlargement of the radiator and an enlargement of the cooling fan. Thus, consideration is made in increasing a passage area of the wind outlet portion formed in the shroud as a means for increasing the wind volume of the cooling wind. However, the shroud has limitations in terms of ensuring the rigidity of the shroud to support the radiator and an increase in the passage area of the wind outlet portion also has limitations. Thus, the increase in the wind volume of the cooling wind is also limited. Furthermore, when the internal combustion engine is a stationary type or when the vehicle mounted with the internal combustion engine is stopped, the cooling wind exhausted from the wind outlet portion close to the radiator sometimes again flows into the radiator, thereby lowering the cooling performance of the radiator.

In a vehicle mounted with an internal combustion engine, such as a vehicle in which the internal combustion is supported in a swinging manner by a vehicle body integrally with the wheels, enhancement of the cooling performance of the radiator by traveling wind cannot be expected too much when the radiator is arranged lateral to the engine main body, since the traveling wind is less likely to flow into the radiator. Thus, the wind volume of the cooling wind must be increased in order to enhance the cooling performance of the radiator.

Moreover, in a vehicle mounted with an internal combustion engine, the wind exhaust duct is sometimes preferably arranged so as to extend in the front and back direction instead of being arranged so as to extend in the left and right direction due to mounting modes of the internal combustion engine with respect to the vehicle body when increasing the wind volume of the cooling wind by exhausting the cooling wind (i.e., exhausted wind) passed through the radiator through the wind exhaust duct. In this case, however, the wind exhaust outlet portion of the wind exhaust duct becomes close to a fender that covers the wheels, and the fender sometimes inhibits smooth exhaust of the exhausted wind from the wind exhaust outlet portion. When the wind exhaust duct is arranged avoiding the fender, the wind exhaust duct enlarges, and furthermore, a compact arrangement becomes difficult.

SUMMARY OF THE INVENTION

The preset invention is proposed in view of the above to increase the wind volume of the cooling wind that flows through the radiator and to enhance the cooling performance of the radiator by arranging the wind exhaust duct using a crankcase of the internal combustion engine. The present invention also aims to enhance the cooling performance of the radiator in a vehicle mounted with the internal combustion engine equipped with the radiator, which is arranged lateral to the engine main body. The present invention also aims to prevent smooth exhaust of the exhausted wind from being inhibited by the fender and to miniaturize the wind exhaust duct and achieve a compact arrangement by exhausting the exhausted wind of the wind exhaust duct through the fender to a space formed between the wheels and the fender. The present invention further aims to smooth the flow of the exhausted wind in the wind exhaust duct by suppressing entrance of foreign materials such as small rocks into the wind exhaust duct. The present invention also aims to enhance the cooling effect of the crankcase with the exhausted wind exhausted from the wind exhaust duct. The present invention further aims to promote exhaust of the exhausted wind using airflow generated by the rotation of the wheels.

A first aspect of the present invention relates to an internal combustion engine having an engine main body configured by a crankcase and a cooling device including a radiator arranged lateral to the engine main body, wherein the cooling device includes a wind exhaust duct for exhausting exhausted wind, which is cooling wind passed through the radiator, to an atmosphere, and the wind exhaust duct is arranged on an upper portion of the crankcase.

According to a second aspect of the present invention, a power transmission system including a transmission case for accommodating a transmission is arranged on the side opposite to the radiator with the crankcase in between in a direction of a rotational axis of a crankshaft supported by the crankcase, and the wind exhaust duct is extended along the rotational axis of the crankshaft and position on the upper portion of the transmission case in the internal combustion engine.

According to a third aspect of the present invention, the internal combustion engine is supported by a body frame at supporting parts arranged at a lower portion of the crankcase.

A fourth aspect of the present invention relates to a vehicle with wheels, the vehicle having an internal combustion engine mounted thereon, the internal combustion engine having an engine main body configured by a crankcase and a cooling device including a radiator arranged lateral to the engine main body, wherein the cooling device includes a wind exhaust duct for exhausting exhausted wind, which is cooling wind passed through the radiator, from an wind exhaust outlet portion to an atmosphere, and the wind exhaust duct is arranged on an upper portion of the crankcase.

According to a fifth aspect of the present invention, a fender for covering the wheel from an outer side in a radial direction having a rotational axis of the wheel as a center is further arranged, wherein the exhausted wind is exhausted to a space formed between the wheel on an inner side in the radial direction and the fender using an opening formed in the fender in the vehicle.

According to a sixth aspect of the present invention, a fender for covering the wheel from an outer side in a radial direction having a rotational axis of the wheel as a center is further arranged, wherein the wind exhaust duct is coupled with the fender, and the wind exhaust outlet portion is formed by a coupling portion to the fender of the wind exhaust duct in the vehicle.

According to a seventh aspect of the present invention, the wind exhaust outlet portion opens at a position facing a tread of the wheel in the radial direction, and a shielding part for suppressing foreign materials taken up by the wheel or foreign materials attached to the tread and scattered by centrifugal force from entering inside the wind exhaust duct is arranged in the wind exhaust duct or the fender in the vehicle.

According to the eighth aspect of the present invention, the shielding part extends along an outer surface of the crankcase in the vehicle.

According to the ninth aspect of the present invention, the exhausted wind is exhausted from the wind exhaust outlet portion to a space formed between the wheel and the fender or to a space formed between the wheel and the crankcase in a direction of a rotating direction at a region closest to the wind exhaust outlet portion in the wheel in the vehicle.

According to the first aspect of the present invention, limitations related to the size of the passage area of the wind exhaust duct are small and the wind volume of the cooling wind that passes through the radiator can be increased by increasing the passage area of the wind exhaust duct since the wind exhaust duct is arranged using the upper portion of the crankcase, whereby the cooling performance of the radiator, and furthermore, the internal combustion engine is enhanced.

According to the second aspect of the present invention, the cooling wind exhausted to the atmosphere is prevented from again passing through the radiator since the wind exhaust duct is extended to the side opposite to the radiator with the crankcase in between, whereby the cooling performance of the radiator is enhanced.

According to the third aspect of the present invention, the supporting parts for supporting the internal combustion engine are not arranged at the upper portion of the crankcase. Therefore, the passage area of the wind exhaust duct to be arranged at the upper portion of the crankcase can be enlarged thereby increasing the wind volume of the cooling wind, whereby the cooling performance of the radiator is enhanced and the degree of freedom of layout of the wind exhaust duct is increased.

According to the fourth aspect of the present invention, limitations related to the size of the passage area of the wind exhaust duct are small and the wind volume of the cooling wind that passes through the radiator can be increased by increasing the passage area of the wind exhaust duct since the wind exhaust duct is arranged using the upper portion of the crankcase even in the case of the vehicle mounted with the internal combustion engine, in which vehicle enhancement of the cooling performance of the radiator by traveling wind cannot be expected too much since the radiator is arranged lateral to the engine main body, whereby the cooling performance of the radiator, and furthermore, the internal combustion engine is enhanced.

According to the fifth aspect of the present invention, the exhausted wind of the wind exhaust duct is exhausted to the space formed between the wheel and the fender using the opening formed in the fender. Therefore, the exhausted wind from the wind exhaust outlet portion is prevented from hitting the fender and inhibiting the exhaust of the exhausted wind, and furthermore, the wind exhaust duct can be miniaturized and compact arrangement can be achieved since the wind exhaust duct does not need to be arranged avoiding the fender.

According to the sixth aspect of the present invention, the exhausted wind of the wind exhaust duct is discharged to the space formed between the wheel and the fender through the wind exhaust outlet portion or the opening formed in the fender since the wind exhaust outlet portion of the wind exhaust duct is formed by the coupling portion to the fender of the wind exhaust duct, whereby the exhausted wind from the wind exhaust outlet portion is prevented from hitting the fender and inhibiting the exhaust of the exhausted wind, and furthermore, the wind exhaust duct can be miniaturized and compact arrangement can be achieved since the exhaust wind duct does not need to be arranged avoiding the fender.

According to the seventh aspect of the present invention, the exhaust of the exhausted wind from the wind exhaust outlet portion is prevented or suppressed from being inhibited by foreign materials by the shielding part, whereby the flow of the exhausted wind in the wind exhaust duct including the wind exhaust outlet portion becomes smooth, which contributes to enhancing the cooling performance of the radiator.

According to the eighth aspect of the present invention, the exhausted wind exhausted from the wind exhaust duct flows along the outer surface of the crankcase. Therefore, the contacting range of the outer surface and the exhausted wind increases, thereby enhancing the cooling effect of the crankcase by the exhausted wind.

According to the ninth aspect of the present invention, air flow in the direction substantially the same as the exhausting direction of the exhausted wind is generated by the rotation of the wheels in the space between the wheel and the fender or the space between the wheel and the crankcase to which the exhausted wind is exhausted. Therefore, the exhaust of the exhausted wind from the wind exhaust outlet portion is promoted by using such airflow, thereby increasing the wind volume of the cooling wind that passes through the radiator and enhancing the cooling performance of the radiator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
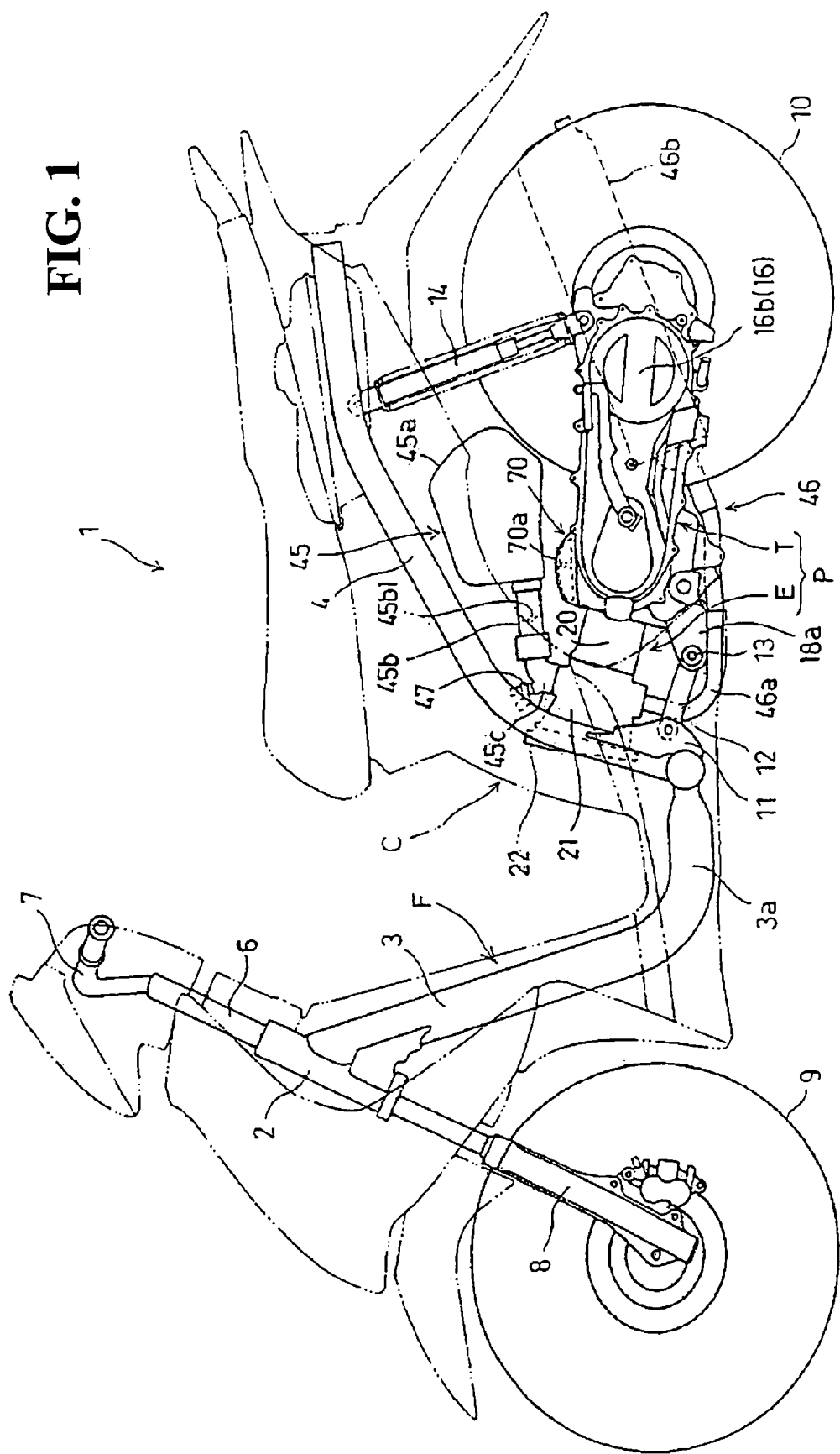
FIG. 1 is a left side view of a first embodiment of the present invention showing a motorcycle mounted with a power unit including a water cooled internal combustion engine and a power transmission system.

The present invention will now be described in detail with reference to the accompanying drawings, wherein the same reference numerals will be used to identify the same or similar elements throughout the several views. It should be noted that the drawings should be viewed in the direction of orientation of the reference numerals.

FIGS. 1 to 5 are views describing the first embodiment. With reference to FIG. 1, a scooter type motorcycle 1 is a compact vehicle that serves as a vehicle mounted with a water-cooled internal combustion engine E applied with the present invention. The scooter type motorcycle 1 includes: a vehicle body configured by a body frame F; a vehicle body cover C made of synthetic resin for covering the body frame F; and a front wheel 9 and a rear wheel 10 serving as wheels. The body frame F includes: a head pipe 2 positioned at the front end of the vehicle body; one down tube 3 extending diagonally downward towards the rear from the head pipe 2; a pair of left and right rear frames 4 connected to a horizontal portion 3a in the lower portion of the down tube 3 and extending diagonally upward towards the rear from both left and right sides of the horizontal portion 3a; and a plurality of cross members (not shown) for connecting the left and right rear frames 4. The compact vehicle includes three-wheeled vehicles in addition to motorcycles, and also includes saddle-ride type vehicles.

In the specification, the directions up and down refer to the vertical direction. Furthermore, in the embodiment, front and rear, left and right correspond to front and rear, left and right of the motorcycle 1, where front or rear is one or the other in the direction of a cylinder axis, and right or left is one or the other in the direction of a rotational axis Le of a crankshaft 26 or in the vehicle width direction.

A steering handlebar 7 is arranged on the upper end and a front fork 8 on the lower end of a steering shaft 6 rotatably supported by the head pipe 2. The front wheel 9 is journaled to the lower end of the front fork 8. The rear wheel 10 serving as a driving wheel is journaled to the rear end of a power unit P for generating power to rotatably drive the rear wheel 10. The power unit P has the front end thereof supported in a swinging manner with a pair of brackets 18a, 18b (see also FIG. 3) serving as supporting parts arranged at the lower portion of the crankcase 23, to be hereinafter described, at a pivot shaft 13 supported by way of a link 12 to a support plate 11 coupled to the front portion of the pair of rear frames 4, and the rear end supported at the rear portion of the left rear frame 4 by way of a rear suspension 14. Thus, the power unit P and the rear wheel 10 are supported by the body frame F so as to swing in the up and down direction by way of the supporting plate 11, the link 12, and the pivot shaft 13. Therefore, the internal combustion engine E and the power transmission system T configuring the power unit P, and furthermore, a cooling device 50 including a radiator 52 and a cooling fan 53 arranged in the internal combustion engine E are supported by the body frame F in a swinging manner integrally with the rear wheel 10 that is supported by the body frame F in a swinging manner.

Figure 4:
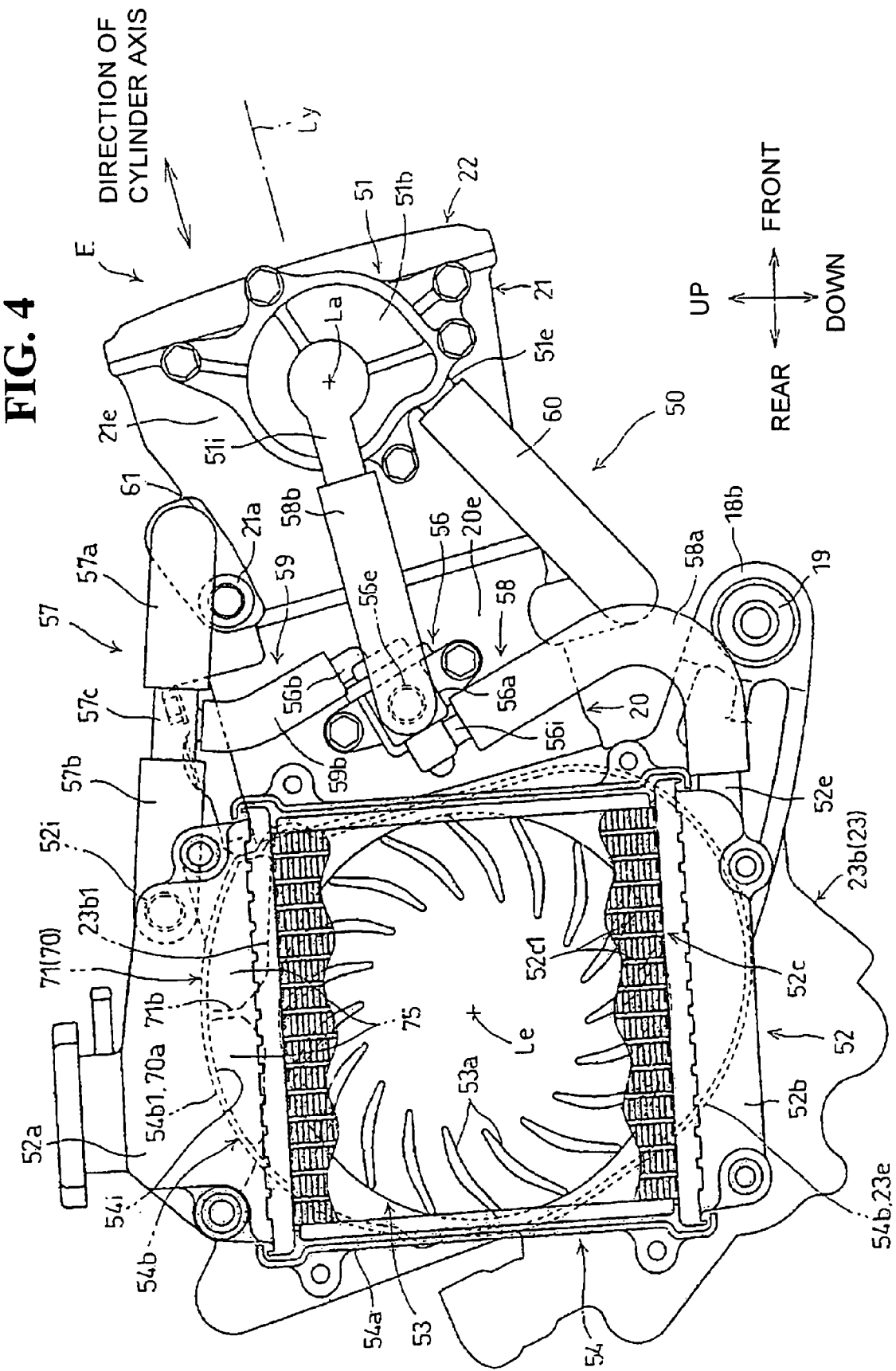
FIG. 4 is a right side view of the main parts of the internal combustion engine of FIG. 1.
Figure 5:
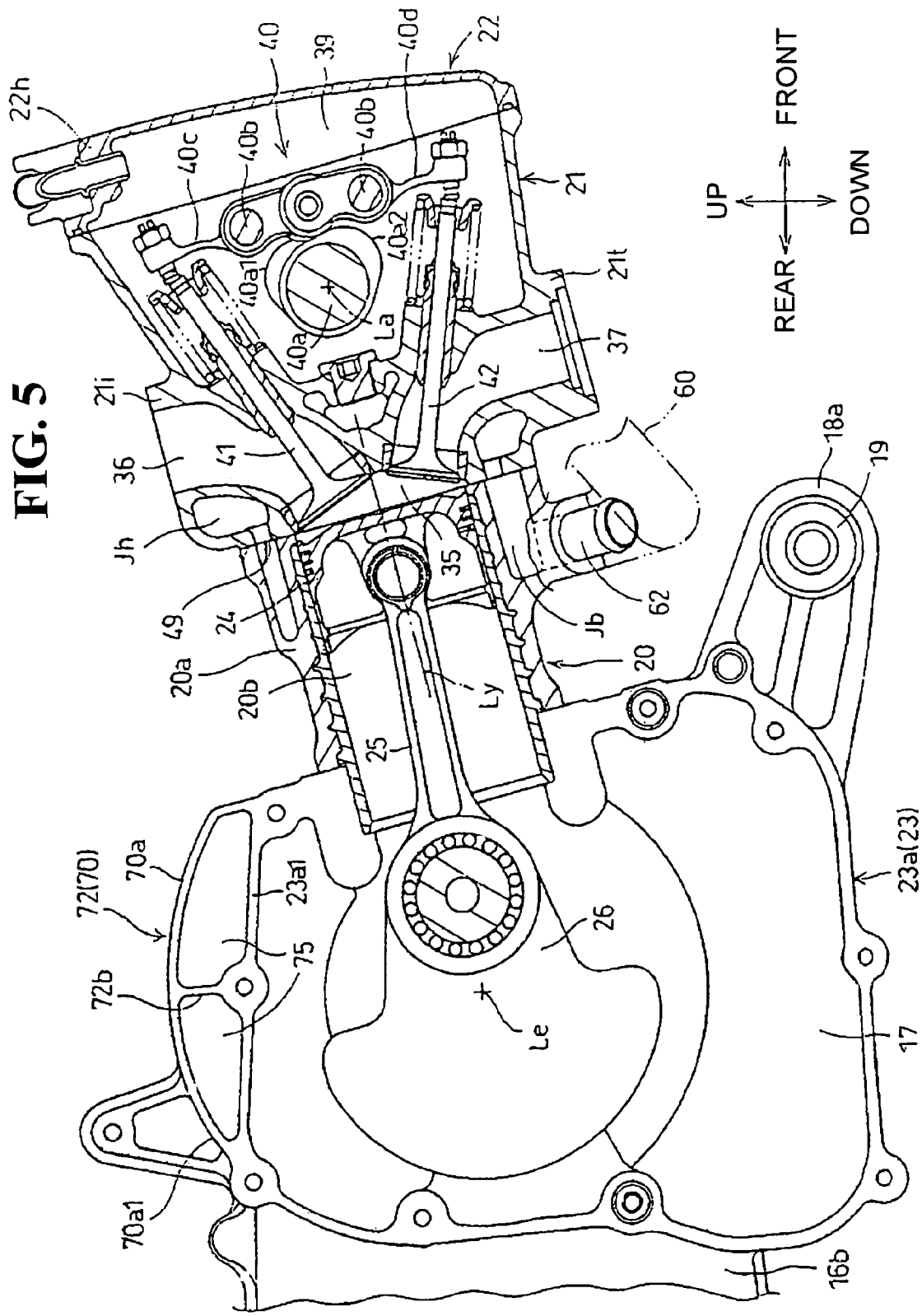
FIG. 5 is a cross sectional view of the main parts taken along line V-V of FIG. 3.

In addition, a cylindrical mount rubber 19 serving as a buffer is interposed between the pivot shaft and the brackets 18a, 18b (see FIG. 4, FIG. 5).

Figure 2:
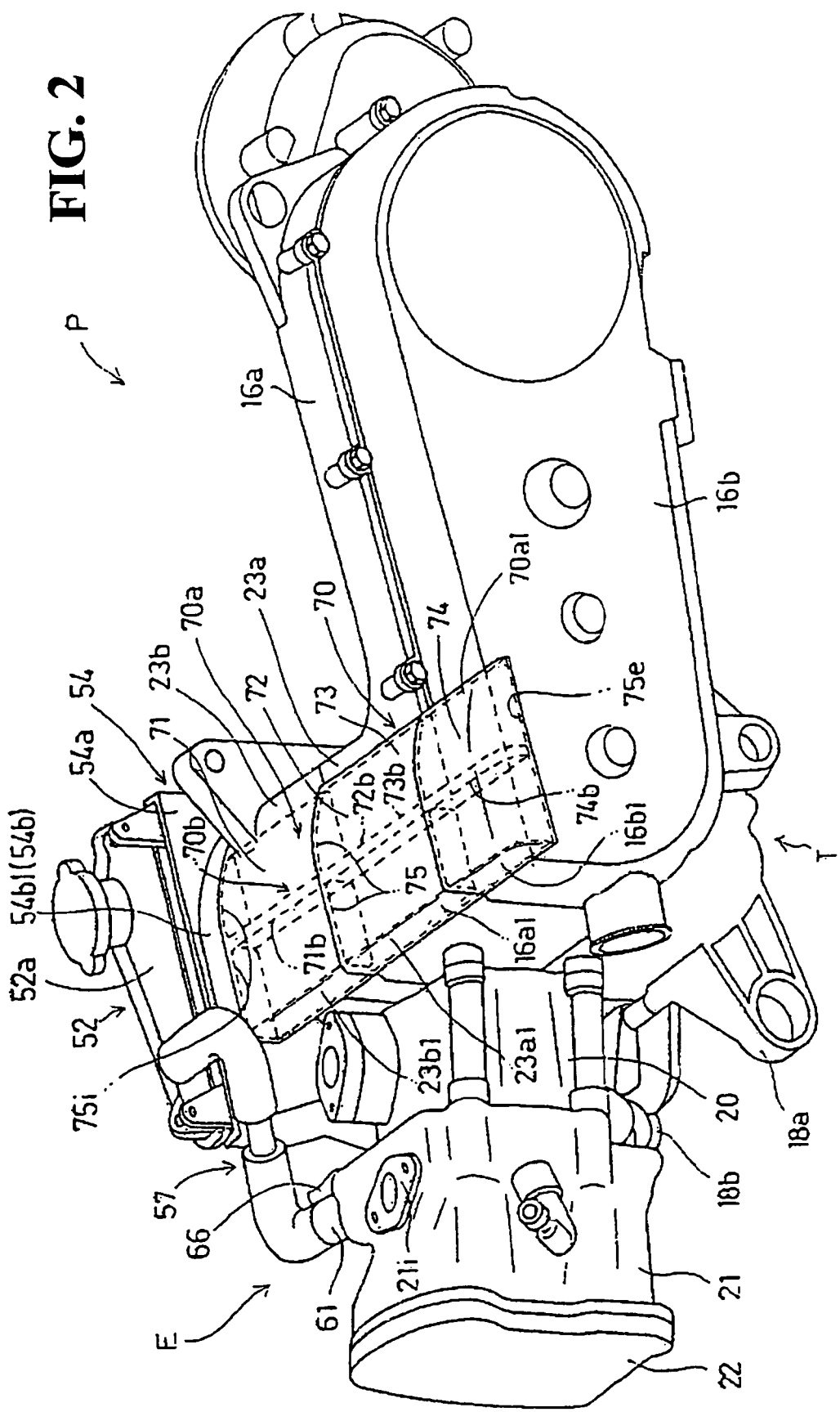
FIG. 2 is a perspective view of the main parts of the power unit of FIG. 1.
Figure 3:
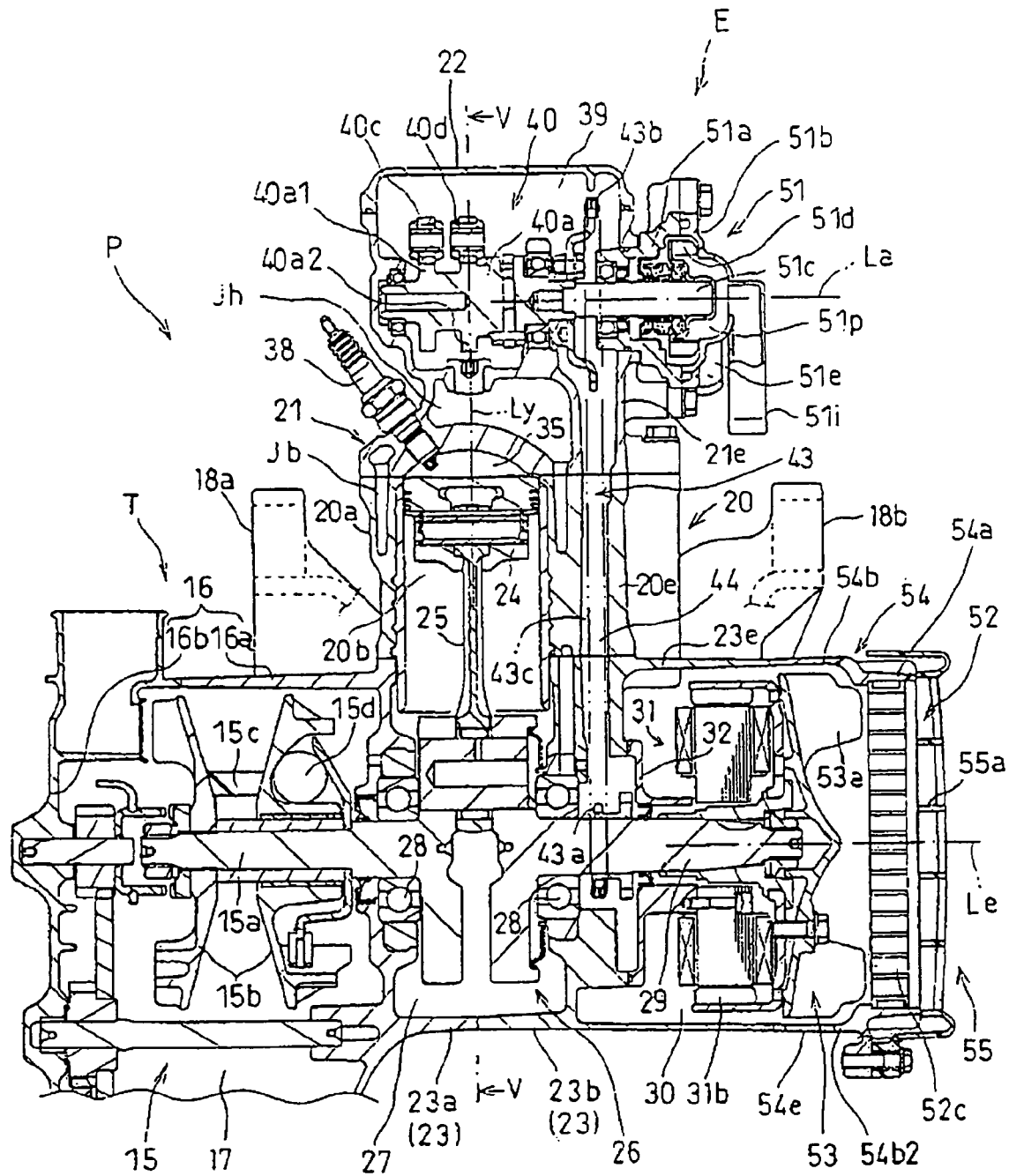
FIG. 3 is a cross sectional view of the main parts having a plane including the cylinder axis of the internal combustion engine of FIG. 1 and being parallel to the rotational axis of the crankshaft as the main cross section.

Referring also to FIGS. 2 and 3, the power unit P supported by the body frame F and arranged at the left portion of the body frame F includes a laterally mounted one-cylinder 4-stroke internal combustion engine E having the rotational axis Le in which the crankshaft 26 is directed in the vehicle width direction (left and right direction), and a power transmission system T for transmitting power generated by the internal combustion engine E to the rear wheel 10. The power transmission system T includes a belted transmission 15 serving as a transmission, a transmission case 16 for accommodating the transmission 15, and a final reduction mechanism (not shown) configured by gear trains. The transmission 15 that is accommodated in a power transmission chamber 17 formed by the transmission case 16 includes: a drive pulley 15b arranged on a drive shaft 15a integrally formed coaxially with the crankshaft 26 and rotatably driven by the crankshaft 26; a driven pulley (not shown) arranged on an output shaft coupled to the rear wheel 10 by way of the final reduction mechanism; and a V-belt 15c stretched across the drive pulley 15b and the driven pulley. The gear ratio of the transmission 15 is automatically changed when the effective radius of the driven pulley is changed at the same time as when the effective radius of the drive pulley 15b is changed by a centrifugal weight 15d that moves according to the rotation speed of the engine. The transmission case 16 is configured by a case body 16a and a transmission cover 16b coupled to the left end of the case body 16a with a great number of bolts.

With reference to FIGS. 1 to 5, the internal combustion engine E includes: an engine main body (hereinafter referred to as "engine main body") configured by a cylinder block 20 made up of one cylinder 20a formed with a cylinder bore 20b to which a piston 24 is fitted in a reciprocating manner; a cylinder head 21 coupled to the front end of the cylinder block 20; a head cover 22 coupled to the front end of the cylinder head 21; and a crankcase 23 coupled to the rear end of the cylinder block 20. The cylinder 20a is arranged on the body frame F in a state tilted slightly upward with respect to the horizontal surface, and thus in a state greatly tilted forward so that the cylinder axis Ly thereof extends slightly diagonally upward towards the front.

The crankcase 23 is formed integrally with the case body 16a, and is divided into a left half case 23a formed integrally with the bracket 18a and a right half case 23b formed integrally with the bracket 18b. The bracket 18a is integrally molded with the case body 16a since the case body 16a is integrally molded with the left half case 23a. The crankshaft 26 coupled to the piston 24 by way of a connecting rod 25 is accommodated in a crank chamber 27 formed by the crankcase 23 and is rotatably supported by both half cases 23a, 23b by way of a pair of main bearings 28.

The left axial end portion of the crankshaft 26 projecting towards the left from the crank chamber 27 extends into the power transmission chamber 17 and forms the drive shaft 15a. The right axial end portion of the crankshaft 26 projecting towards the right from the crank chamber 27 extends into an auxiliary chamber 30 in which an AC generator 31 and a cooling fan 53 are accommodated and forms a drive shaft 29 of the AC generator 31 and the cooling fan 53. Thus, the drive shaft 29 is integrally formed coaxially with the crankshaft 26 and rotatably driven by the crankshaft 26. The auxiliary chamber 30 is formed by the right end portion 23e of the right half case 23b and the cylindrical shroud 54 coupled to the right end portion 23e.

With reference to FIGS. 3 and 5, the cylinder head 21 is formed with a combustion chamber 35 including a concave portion at a position facing the cylinder bore 20b in the direction of the cylinder axis, an intake port 36 and an exhaust port 37 opening to the combustion chamber 35, and a spark plug 38 facing the combustion chamber 35. In a valve train chamber 39 formed by the cylinder head 21 and the head cover 22, a valve train 40 for driving to open and close an intake valve 41 for opening and closing the intake port 36 and an exhaust valve 42 for opening and closing the exhaust port 37 are accommodated. The valve train 40 of overhead camshaft type includes a camshaft 40a formed with an intake cam 40a1 and an exhaust cam 40a2 and rotatably arranged in the cylinder head 21 serving as valve operating cams, an intake rocker arm 40c and an exhaust rocker arm 40d supported in a swinging manner by a rocker shaft 40b and respectively driven and swung by the intake cam 40a1 and the exhaust cam 40a2. The camshaft 40a having a rotational axis La parallel to the rotational axis Le is coupled to the crankshaft 26 by way of a winding power transmission mechanism 43, and is rotatably driven by the power of the crankshaft 26 at ½ the rotation speed thereof.

The power transmission mechanism 43 accommodated in a chain chamber 44 serving as an accommodating chamber arranged along the cylinder axis Ly at the right end portion 23e of the crankcase 23, the right end portion 20e of the cylinder block 20, and the right end portion 21e of the cylinder head 21 includes a drive sprocket 43a serving as a drive body arranged in the crankshaft 26, a cam sprocket 43b serving as a driven body arranged in the camshaft 40a, and an endless chain 43c serving as an endless power transmission band stretched over both sprockets 43a, 43b. The intake cam 40a1 and the exhaust cam 40a2 of the rotating camshaft 40a open/close operate the intake valve 41 and the exhaust valve 42 at a predetermined timing in synchronization with the rotation of the crankshaft 26 through the intake rocker arm 40c and the exhaust rocker arm 40d.

With reference to FIG. 1, the internal combustion engine E includes: an intake device 45 with an air cleaner 45a, a throttle valve device 45b, and an intake pipe 45c connected to a connection portion 21i of the cylinder head 21, for guiding the intake air to the combustion chamber 35; a fuel injection valve 47 attached to the intake pipe 45c for supplying the fuel to the intake air; and an exhaust device 46 including an exhaust pipe 46a and a silencer 46b for guiding the exhaust gas flowed out from the exhaust port 37 to the outside of the internal combustion engine E, and also includes a cooling device 50 for flowing the cooling water for cooling the cylinder block 20 and the cylinder head 21 to water jackets Jb, Jh arranged at the cylinder block 20 and the cylinder head 21, with reference also to FIGS. 2 to 5.

The intake air that flows through the intake device 45 is flow-rate-controlled by the throttle valve 45b1 arranged in the throttle valve device 45b, and mixed with fuel supplied from the fuel injection valve 47 to generate fuel-air mixture. The fuel-air mixture flows into the combustion chamber 35 through the intake port 36 when the intake valve 41 is opened, and then ignited and combusted by the spark plug 38. The piston 24 driven by the pressure of the generated combustion gas then reciprocates and rotatably drives the crankshaft 26. Thereafter, the combustion gas flows out from the exhaust port 37 as exhaust gas when the exhaust valve 42 is opened. The exhaust gas from the exhaust port 37 is flowed through the exhaust pipe 46a connected to the connection portion 21t of the cylinder head 21 to which the outlet of the exhaust port 37 is opened and is exhausted to the outside through the exhaust device 46. The rotation of the crankshaft 26 is automatically speed changed according to the rotation speed of the engine by the transmission 15, and transmitted to the rear wheel 10 thereby rotatably driving the rear wheel 10 by the internal combustion engine E.

With reference to FIGS. 2 to 5, the cooling device 50 supplies and discharges cooling water to the water jackets Jb, Jh configured by a cylinder block water jacket Jb arranged in the cylinder block 20 so as to surround the cylinder bore 20b, and a cylinder head water jacket Jh arranged in the cylinder head 21 so as to communicate with the cylinder block water jacket Jb through a communication hole formed in a gasket 49 and so as to cover the combustion chamber 35.

The cooling device 50 includes a water pump 51 for pumping out the cooling water to the water jackets Jb, Jh; a radiator 52 through which the cooling water of the water jackets Jb, Jh flows; a cooling fan 53 for generating cooling wind for promoting heat radiation of the cooling water flowing through the radiator 52; a shroud 54 for covering the cooling fan 53; a radiator cover 55 for guiding the cooling wind towards the radiator core 52c of the radiator 52; a wind exhaust duct 70 for exhausting cooling wind which is cooling wind passed through the radiator 52 to the atmosphere; a thermostat 56 for communicating and shutting off cooling water between the radiator 52 and the water pump 51 so as to control flow and shutting off of the cooling water to the radiator 52 according to the warm-up state of the internal combustion engine E; and a piping group through which the cooling water flows.

The water pump 51 is attached to the right end portion 21e, which is the end closer to the radiator 52 in the right direction, of the cylinder head 21. The water pump 51 includes: a body 51a connected to the right end portion 21e; a cover 51b connected to the body 51a with a bolt and formed with an intake port portion 51i and a discharge port portion 51e; a pump shaft 51c rotatably supported at the body 51a and connected to the axial end portion of the camshaft 40a; and an impeller 51d connected to the pump shaft 51c and arranged in a pump chamber 51p formed by the body 51a and the cover 51b.

The radiator 52 is arranged spaced apart in the right direction serving as one side in the direction of the rotational axis that is a vehicle width direction (left and right direction in the embodiment) with respect to the crankcase 23. Substantially the entire radiator 52 is arranged at the rear of the cylinder block 20 and the cylinder head 21 in the front and rear direction (see FIG. 4), and is arranged at a position overlapping the crankcase 23 when seen from the right direction (that is when seen from the side, or when seen in the flow-in direction of the cooling wind). The AC generator 31 and the cooling fan 53 are arranged between the chain chamber 44 and the radiator 52 in the right direction with respect to the crankcase 23.

The radiator 52 is connected to the right end portion 23e, which is the end closer to the radiator 52 in the right direction, of the crankcase 23 by way of the shroud 54. The radiator 52 includes: an upper tank 52a serving as an inlet tank formed with an inlet connection portion 52i to be connected with an inlet piping 57 for guiding from the cylinder head 21 to the radiator 52 high temperature cooling water after flowing through both water jackets Jb, Jh and cooling the cylinder block 20 and the cylinder head 21; a radiator core 52c including a great number of heat transfer tubes 52c1 to which the cooling water in the upper tank 52a flows; and a lower tank 52b serving as an outlet tank to which the low temperature cooling water after radiating in the radiator core 52c flows from each heat transfer tube 52c1 and collected thereat. The lower tank 52b is formed with an outlet connection portion 52e to be connected with an outlet piping 58 for guiding the cooling water after heat radiation to the water pump 51 through the thermostat 56.

With reference to FIG. 3, the cooling fan 53 connected to the drive shaft 29 by way of the rotor 31b of the AC generator 31 is arranged between the rotor 31b and the radiator core 52c in the direction of the rotational axis. The radial flow cooling fan 53 including a great number of vanes 53a is arranged to face the radiator core 52c in the direction of the rotational axis at the downstream of the radiator core 52c in the wind path formed by the radiator cover 55 and the shroud 54, and generates cooling wind that flows into the radiator core 52c from the upstream by taking in air that has passed through the radiator core 52c.

The shroud 54 is a single member made of synthetic resin including a holding portion 54a for holding the radiator 52 and a cylindrical cover portion 54b for covering the outer side in the radial direction of the cooling fan 53. The covering portion 54b is formed with a wind outlet portion 54e configured by a plurality of slits formed substantially parallel in the direction of the rotational axis at an interval in the circumferential direction of the cooling fan 53, and an exhausted wind guiding portion 54i for guiding the cooling wind to the wind exhaust duct 70 (see FIG. 4). The exhausted wind guiding portion 54i is formed at the upper portion 54b1 of the covering portion 54b and the wind outlet portion 54e is formed at the rear portion 54b2 of the covering portion 54b. The cooling wind that has passed through the radiator core 52c and cooled the radiator core 52c (hereinafter referred to as "exhausted wind") is passed through the wind outlet portion 54e and discharged to the atmosphere or the outside of the internal combustion engine E, guided by the exhausted wind guiding portion 54i to be flowed into the wind exhaust duct 70 and discharged to the atmosphere through the wind exhaust duct 70 by the cooling fan 53.

The radiator cover 55 arranged so as to cover the outer periphery of the radiator 52 and face the radiator core 52c by being connected to the shroud 54 includes a grille 55a including a latticed current plate. The grille 55a guides the upstream air of the radiator core 52c, which flows from the right direction of a side in the vehicle width direction, as cooling wind so as to be directed towards the radiator core 52c.

With reference to FIG. 1, FIG. 2, FIG. 4, and FIG. 5, the wind exhaust duct 70 forming the wind exhaust path 75 including a wind exhaust inlet portion 75i and a wind exhaust outlet portion 75e is arranged extending linearly along the rotational axis Le across the upper portions of both half cases 23a, 23b or the upper end portions 23a1, 23b1 in the embodiment, and the upper portions of the case body 16a and the transmission cover 16b or the upper end portions 16a1, 16b1 in the embodiment in the power transmission system T arranged on the side opposite to the radiator 52, the cooling fan 53, and the shroud 54 with the crankcase 23 in between in the direction of the rotational axis. Thus, the power transmission system T is arranged on the left direction serving as the other side in the direction of the rotational axis with respect to the crankcase 23.

The passage cross section of the wind exhaust duct 70 has a width in the up and down direction reduced compared to the width in the front and rear direction or the direction of the cylinder axis so as to have a flat shape in the up and down direction, and has a substantially wing cross section. The upper wall 70a of the wind exhaust duct 70 has a cross sectional shape in which a cross section in the plane orthogonal to the rotational axis Le is an arc shape having the rotational axis Le as the center, and smoothly connects to the crankcase 23 and the transmission case 16 at the rear portion 70a1. Furthermore, the wind exhaust duct 70 is at a position lower than the upper most portion 22h of the head cover 22 (see FIG. 5).

The wind exhaust duct 70 is configured by first and second engine side duct portions 71, 72 integrally formed with each half body 23a, 23b, respectively, and spaced apart from the crank chamber 27 by upper end portions 23a1, 23b1 immediately above the crank chamber 27, and first and second transmission side duct portions 73, 74 integrally formed with the case body 16a and the transmission cover 16b, respectively, and spaced apart from the power transmission chamber 17 by upper end portions 16a1, 16b1 immediately above the transmission chamber 17 (see FIG. 3). In the present embodiment, the left half case 23a and the case body 16a are integrally formed to form a single member, and thus the second engine side duct portion 72 and the first transmission side duct portion 73 are also integrally formed.

Each duct portion 71, 72, 73, 74 includes partition walls 71b, 72b, 73b, 74b for dividing the wind exhaust path 75 into two in the present embodiment. Each partition wall 71b, 72b, 73b, 74b extends along the rotational axis Le in each duct portion 71, 72, 73, 74 and forms a partition wall 70b extending across the entire length of the wind exhaust duct 70.

The first engine side duct portion 71 forms a wind exhaust inlet portion 75i opening to the right direction at the wind exhaust guiding portion 54i formed at a position facing the cooling fan 53 at the outer side in the radial direction of the cooling fan 53, and the exhausted wind pushed radially outward by the cooling fan 53 flows in through the wind exhaust guiding portion 54i. The exhausted wind flowed into the first engine side duct portion 71 sequentially flows through the second engine side duct portion 72 and the first transmission side duct portion 73 in parallel to the rotational axis Le and reaches the second transmission side duct portion 74, and is exhausted to the atmosphere from the second transmission side duct portion 74 forming the wind exhaust outlet portion 75e positioned in the left direction from the transmission cover 16b and opened downward. Thus, the wind exhaust duct 70 is arranged across the entire width of the power unit P in the direction of the rotational axis.

The thermostat 56 attached to the right end portion 20e, which is the end closer to the radiator 52 in the right direction, of the cylinder block 20 includes a housing 56a connected to the right end portion 20e, and a thermostat valve (not shown) that is operated by a temperature sensitive element accommodated in the housing 56a. The housing 56a is formed with a bypass port portion 56b to which the cooling water from the cylinder head water jacket Jh flows, an inlet port portion 56i for guiding the cooling water from the radiator 52 into the housing 56a, and an outlet port portion 56e for flowing out the cooling water from the radiator 52 to the water pump 51.

The thermostat valve allows the cooling water to flow between the bypass port portion 56b and the outlet port portion 56e and at the same time shuts off the flow of cooling water between the inlet port portion 56i and the outlet port portion 56e in warm-up of the internal combustion engine E, and allows the cooling water to flow between the inlet port portion 56i and the outlet port portion 56e and at the same time shuts off the flow of cooling water between the bypass port portion 56b and the outlet port portion 56e in completion of warm-up of the internal combustion engine E.

The inlet piping 57 is connected to the cooling water outlet 61 formed at the right end portion 21e of the cylinder head 21, and guides the cooling water that has flowed in from the cylinder block water jacket Jb to the cylinder head water jacket Jh and cooled the cylinder head 21. A fixing portion 21a of the temperature sensor 66 (see FIG. 2) for detecting the cooling water temperature is arranged in the vicinity of the cooling water outlet portion 61.

The inlet piping 57 is configured by a conduit 57a connected to the cooling water outlet portion 61, a conduit 57b connected to the inlet connection portion 52i, and a pipe joint 57c for connecting the conduits 57a, 57b. The inlet piping 57 is formed with a conduit 59b branched at the pipe joint 57c and connected to the bypass port portion 56b, and the bypass piping 59 communicating to the cylinder head water jacket Jh is configured by the conduit 59b, the conduit 57a, and the pipe joint 57c. The bypass piping 59 guides the cooling water from the cylinder head water jacket Jh to the water pump 51 through the thermostat 56 without flowing into the radiator 52 in warm-up of the internal combustion engine E.

The outlet piping 58 connected to the intake port portion 51i for guiding low temperature cooling water from the radiator to the water pump 51 through the thermostat 56 is configured by a conduit 58a connected to the outlet connection portion 52e and the inlet port portion 56i, and a conduit 58b connected to the outlet port portion 56e and the intake port portion 51i.

A supply pipe 60 connected to the discharge port portion 51e is connected to the cooling water inlet portion 62 arranged at the lower end of the cylinder block 20, and guides the cooling water that has flowed in from the radiator 52 and discharged from the water pump 51 to the cylinder block water jacket Jb.

When the internal combustion engine E is operated, the cooling water pumped out by the water pump 51 flows into the cylinder block water jacket Jb from the cooling water inlet portion 62 through the supply pipe 60 to cool the cylinder block 20 and then flows into the cylinder head water jacket Jh to cool the cylinder head 21 by the cooling device 50, and thereafter, flows out from the cylinder head water jacket Jh to the cooling water outlet portion 61, flows into the thermostat 56 through the bypass piping 59, and further flows into the water pump 51 and force-fed by the impeller 51d, so that the cooling water circulates through the circulating path in time of warm-up without flowing through the radiator 52 thereby promoting warm-up of the internal combustion engine E.

After the completion of warm-up of the internal combustion engine E, the cooling water heat radiated by the radiator 52 to be of low temperature is pumped by the water pump 51, and the cooling water force-fed by the impeller 51d flows into the cylinder block water jacket Jb through the supply pipe 60 to cool the cylinder block 20 and then flows into the cylinder head water jacket Jh to cool the cylinder head 21, and thereafter, the cooling water flowed out from the cylinder head water jacket Jh flows into the upper tank 52a of the radiator 52 through the inlet piping 57 from the cooling water outlet portion 61 to be cooled by the cooling wind at the radiator core 52c, and then flows into the lower tank 52b. The cooling water from the lower tank 52b passes through the outlet piping 58 and flows into the water pump 51 through the thermostat 56 and force-fed by the impeller 51d, so that the cooling water circulates through the circulating path after warm-up and the cylinder block 20 and the cylinder head 21 are cooled.

The outside air is taken in at the right portion of the power unit P by the cooling fan 53 rotatably driven by the crankshaft 26 and the radiator core 52c is cooled by the cooling wind flowing in from the grille 55a, whereby heat radiation from the cooling water flowing through the radiator core 52c is promoted. The cooling wind that has passed through the radiator 52 and cooled the cooling water flows into the wind exhaust duct 70 through the exhausted wind guiding portion 54i as exhausted wind, and is discharged downward from the wind exhaust outlet portion 75e at the left end of the power unit P through the wind exhaust duct 70.

The operation and effect of the embodiment configured as above will now be described.

The cooling device 50 of the internal combustion engine E supported by the body frame F in a swinging manner integrally with the rear wheel 10 includes a wind exhaust duct 70 for exhausting the cooling wind generated by the rotation of the cooling fan 53 and passed through the radiator 52 to the atmosphere, where the wind exhaust duct 70 is arranged at the upper end portions 23a1, 23b1 in the upper portion of the crankcase 23 and the upper end portions 16a1, 16b1 in the upper portion of the transmission case 16, whereby limitations related to the size of the passage area of the wind exhaust duct 70 are small compared to when the wind outlet portion of large passage area is formed in the shroud 54, and the wind volume of the cooling wind that passes through the radiator 52 can be increased by increasing the passage area of the wind exhaust duct 70 since the wind exhaust duct 70 is arranged using the upper end portions 23a1, 23b1 and the upper end portions 16a1, 16b1 even in the motorcycle 1 where enhancement of the cooling performance of the radiator 52 by traveling wind 52 cannot be expected too much as the radiator 52 is arranged lateral to the crankcase 23 serving as the engine main body, thereby enhancing the cooling performance of the radiator 52, and furthermore, the internal combustion engine E, without enlarging the radiator core 52c of the radiator 52 and the cooling fan 53. Furthermore, the wind volume of the cooling wind can be further increased since the wind outlet portion 54e is formed in the shroud 54.

The power transmission system T including the transmission case 16 for accommodating the transmission 15 is arranged on the side opposite to the radiator 52 with the crankcase 23 in between in the direction of the rotational axis of the crankshaft 26, and the wind exhaust duct 70 is extended along the rotational axis Le of the crankshaft 26 and positioned at the upper end portions 16a1, 16b1 of the transmission case 16, whereby the wind exhaust duct 70 is extended up to the side opposite to the radiator 52 with the crankcase 23 in between thereby preventing the exhausted wind exhausted to the atmosphere from flowing in from the grille 55a and again passing through the radiator 52 while the vehicle is stopped, thus enhancing the cooling performance of the radiator 52.

The power unit P including the internal combustion engine E and the power transmission system T is arranged at the lower portion of the crankcase 23 and is also supported by the body frame F with the brackets 18a, 18b positioned at the lower portion with respect to the power transmission system T, whereby the brackets 18a, 18b for supporting the internal combustion engine E, and furthermore, supporting the power unit P are not arranged at the upper end portions 23a1, 23b1 of the crankcase 23 and at the upper end portions 16a1, 16b1 of the transmission case 16 thus increasing the passage area of the wind exhaust duct 70 arranged at the upper end portions 23a1, 23b1 and the upper end portions 16a1, 16b1 by such amount and increasing the wind volume of the cooling wind, thereby enhancing the cooling performance of the radiator 52 and increasing the degree of freedom of layout of the wind exhaust duct 70.

The passage cross section of the wind exhaust duct 70 has the width in the up and down direction reduced compared to the width in the front and rear direction or the direction of the cylinder axis so as to have a flat shape in the up and down direction, whereby the crankcase 23 and the transmission case 16 arranged with the wind exhaust duct 70 are suppressed from enlarging in the up and down direction. Furthermore, the upper wall 70a of the wind exhaust duct 70 has a cross sectional shape in which a cross section in the plane orthogonal to the rotational axis Le is an arc shape having the rotational axis Le as the center, and smoothly connects to the crankcase 23 and the transmission case 16 at the rear portion 70a1, whereby the outer appearance of the power unit P in which the wind exhaust duct 70 is arranged at the upper end portions 23a1, 23b1 of the crankcase 23 and the upper end portions 16a1, 16b1 of the transmission case 16 improves.

The wind exhaust duct 70 includes the partition wall 70b for dividing the wind exhaust path 75. The rigidity of the wind exhaust duct 70 is enhanced since the partition wall 70b extends along the rotational axis Le, whereby the desired rigidity of the wind exhaust duct 70 is ensured even if the passage area of the wind exhaust duct 70 is large.

The second embodiment of the present invention will now be described with reference to FIG. 6 to 9. The second embodiment mainly differs from the first embodiment in the configuration of the wind exhaust duct, and other configurations are basically the same. The description on the same component thus will be omitted or simplified, and the description will be made focusing on the different aspect. The same reference numerals are used, as necessary, for the members same as or members corresponding to the members of the first embodiment.

With reference to FIGS. 6 to 9, the power unit P, and thus, the internal combustion E and the power transmission system T are supported by the body frame F in a swinging manner integrally with the rear wheel 10 with the pair of brackets 18a, 18b arranged at the upper portion of the front end of the power unit P, similar to the first embodiment. The bracket 18a is arranged by being integrally molded to the upper portion of the front end of the case body 16a of the transmission case 16. The bracket 18b is arranged by being integrally molded to the upper portion of the front end of the right half case 23b of the crankcase 23. The bracket 18a is integrally molded with the left half case 23a since the case body 16a and the left half case 23a are integrally molded. The pair of brackets 18a, 18b are supported in a swinging manner by the pivot shaft 13 supported by the pair of support plates 11 respectively connected to the left and right rear frames 4. The power unit P, and thus the internal combustion engine E and the power transmission system T. Furthermore, the cooling device 50 including the radiator 52 are supported by the body frame F in a swinging manner in the up and down direction integrally with the rear wheel 10 by way of the support plate 11 and the pivot shaft 13, similar to the first embodiment.

Figure 6:
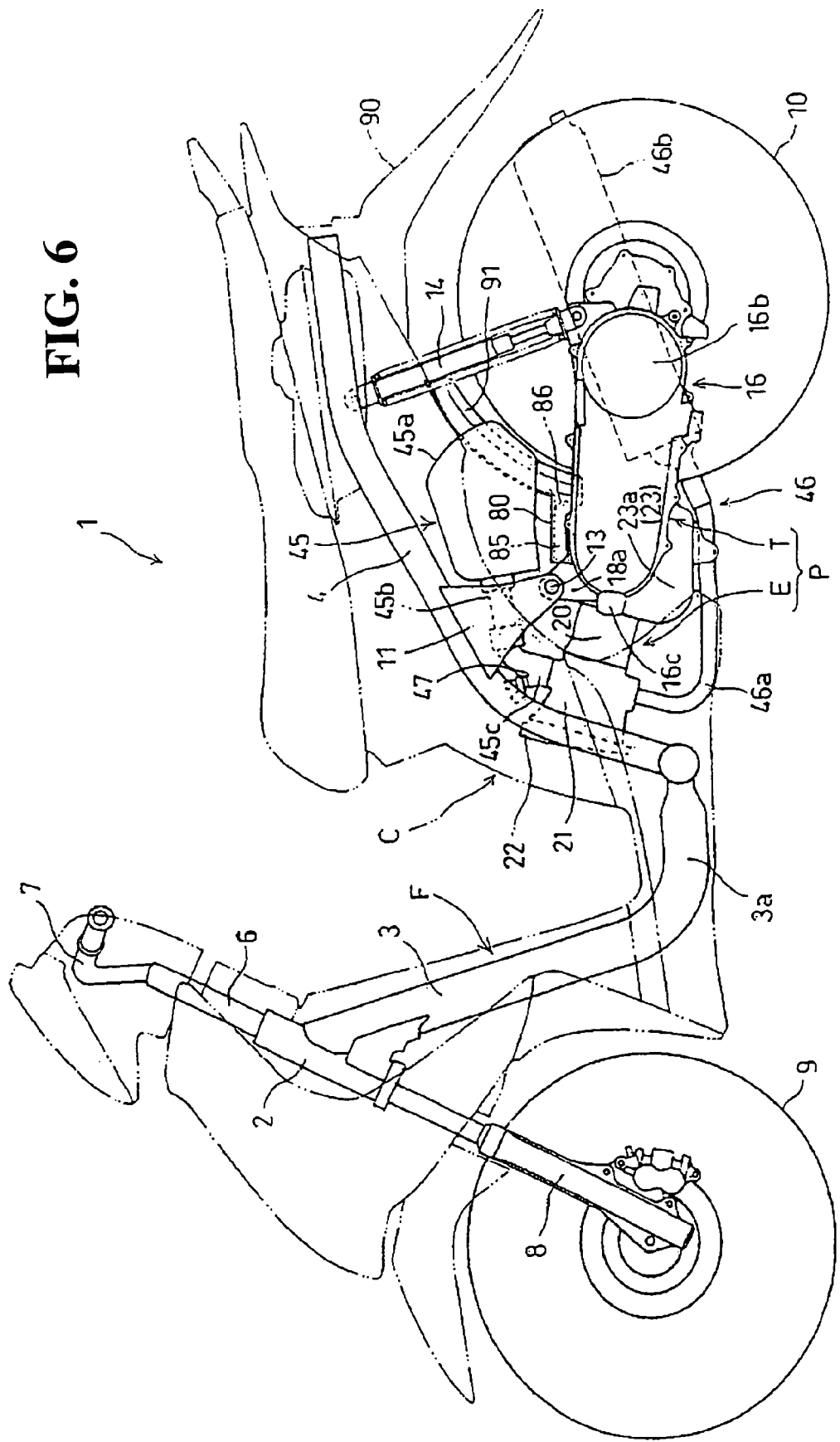
FIG. 6 is a view of a second embodiment of the present invention, corresponding to FIG. 1, showing a motorcycle mounted with a power unit including a water cooled internal combustion engine and a power transmission system.

An air intake portion 16c for taking in air for cooling the belt (similar to belt 15c of FIG. 1) of the transmission accommodated in the transmission case 16 is arranged at the front end of the transmission cover 16b near the front end of the crankcase 23 when seen from the side (see FIG. 6).

The motorcycle 1 includes fenders 90, 91 that cover the rear wheel 10 from the front side towards the rear side and from the outer side in the radial direction with respect to rotational axis Lw of the rear wheel 10 (hereinafter simply referred to as "radial direction"). The fenders 90, 91 include an outer fender 90 serving as a fixed fender that is attached and fixed to the body frame F and an inner fender 91 serving as a movable fender that is positioned radially inward (i.e., towards rotational axis Lw) from the outer fender 90 and that swings with respect to the body frame F integrally with the power unit P and the internal combustion engine E. The inner fender 91 is attached to the right half case 23b at an attachment part 92, is attached to the case body 16a by way of a stay 94 serving as a fixed member at an attachment part 93, and fixed to the power unit P, that is, the internal combustion engine E.

The outer fender 90 covers the rear wheel 10 from the upper side towards the rear side. The inner fender 91 covers the rear wheel 10 from the front side towards the upper side.

A wind exhaust duct 80 forming a wind exhaust path 85 including a wind exhaust inlet portion 85i and a wind exhaust outlet portion 85e is arranged across the upper portions of both half cases 23a, 23b, that is, the upper ends 23a1, 23b2 which are the upper walls of both half cases 23a, 23b in the present embodiment.

The wind exhaust duct 80 arranged between the pair of brackets 18a, 18b in the left and right direction (which is also the vehicle width direction) is a separate component from each half case 23a, 23b and is integrally coupled to the inner fender 91 by being integrally molded with the inner fender 91. The wind exhaust duct 80 is arranged immediately above the half cases 23a, 23b so as to cover the upper face 23a5, 23b5 of each half case 23a, 23b and the rear face 23a6, 23b6 extending downward from the corresponding upper face 23a5, 23b5. The upper face 23a5, 23b5 and the rear face 23a6, 23b6 form the outer surface of the respective half case 23a, 23b.

In this embodiment, the wind exhaust duct 80 is a cover shaped component that covers the half cases 23a, 23b from the upper side, and forms the wind exhaust path 85 in cooperation with each half case 23a, 23b. The exhausted wind thus contacts each half case 23a, 23b and flows through the wind exhaust path 85, whereby the crankcase 23 is cooled by the exhausted wind. The wind exhaust duct 80 may be a tubular component so that only the wind exhaust duct 80 forms the wind exhaust path 85.

Figure 7:
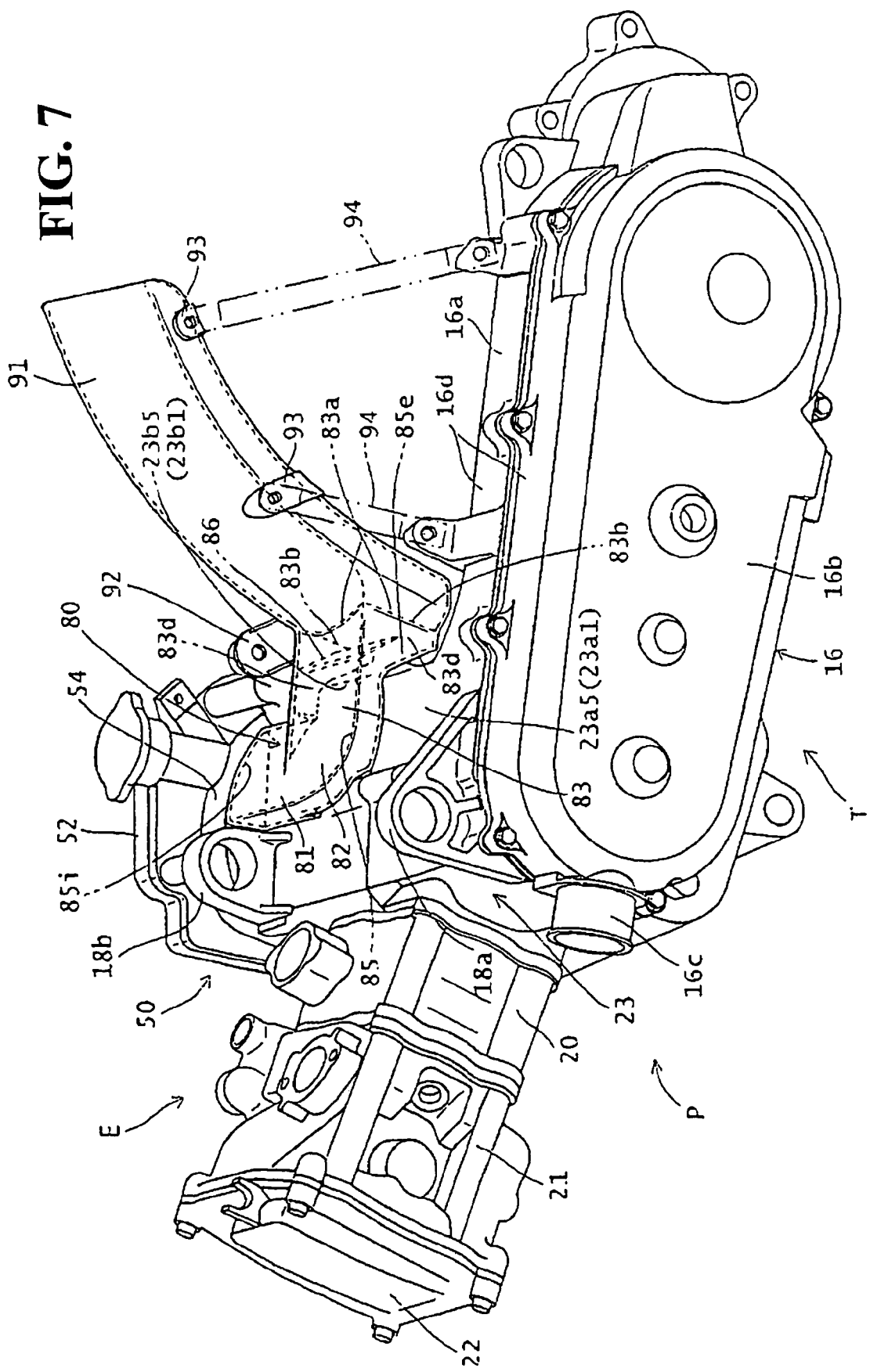
FIG. 7 is a perspective view of the main parts of the power unit and a fender of the motorcycle of FIG. 6.
Figure 8:
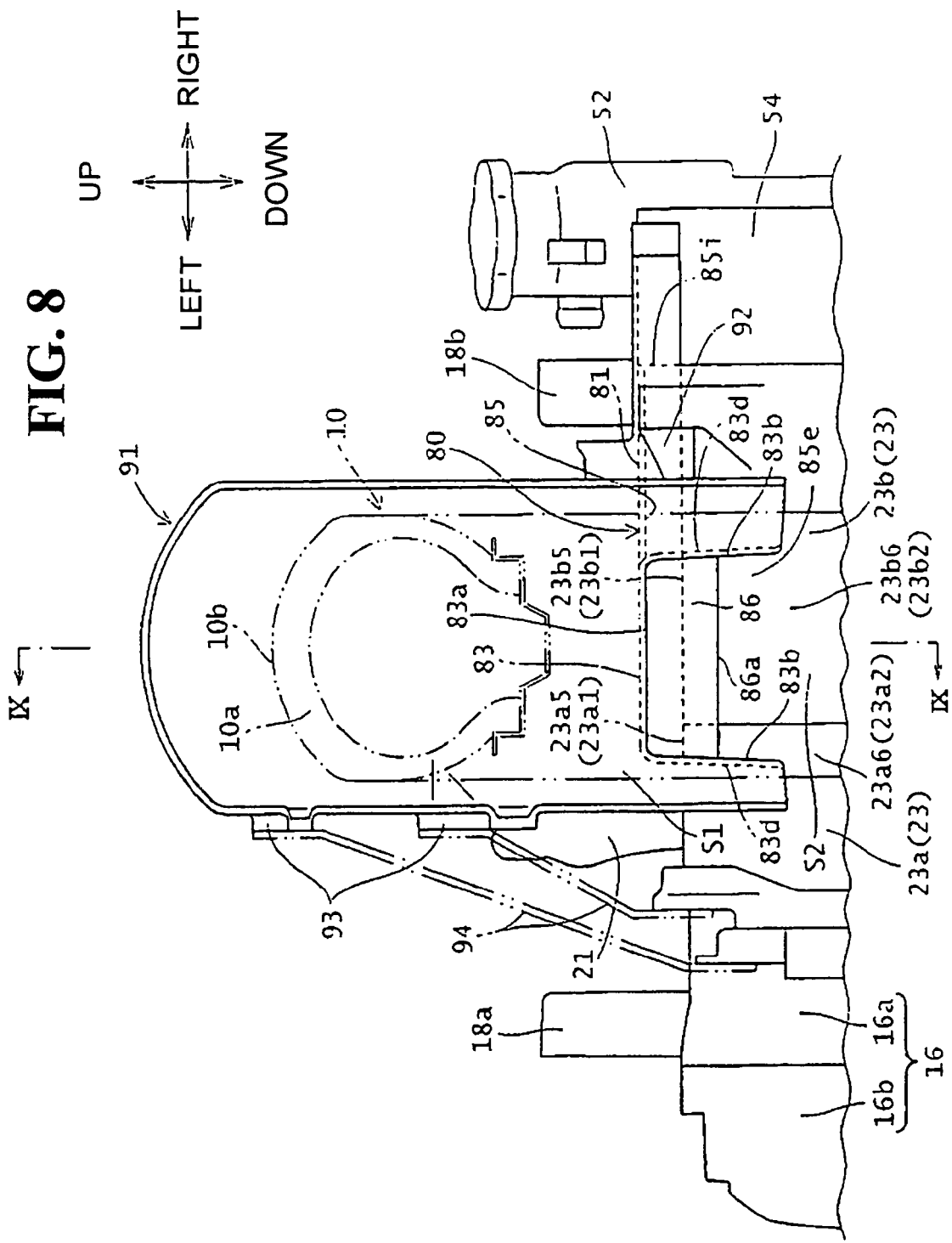
FIG. 8 is a rear view of the main parts of the motorcycle of FIG. 6.
Figure 9:
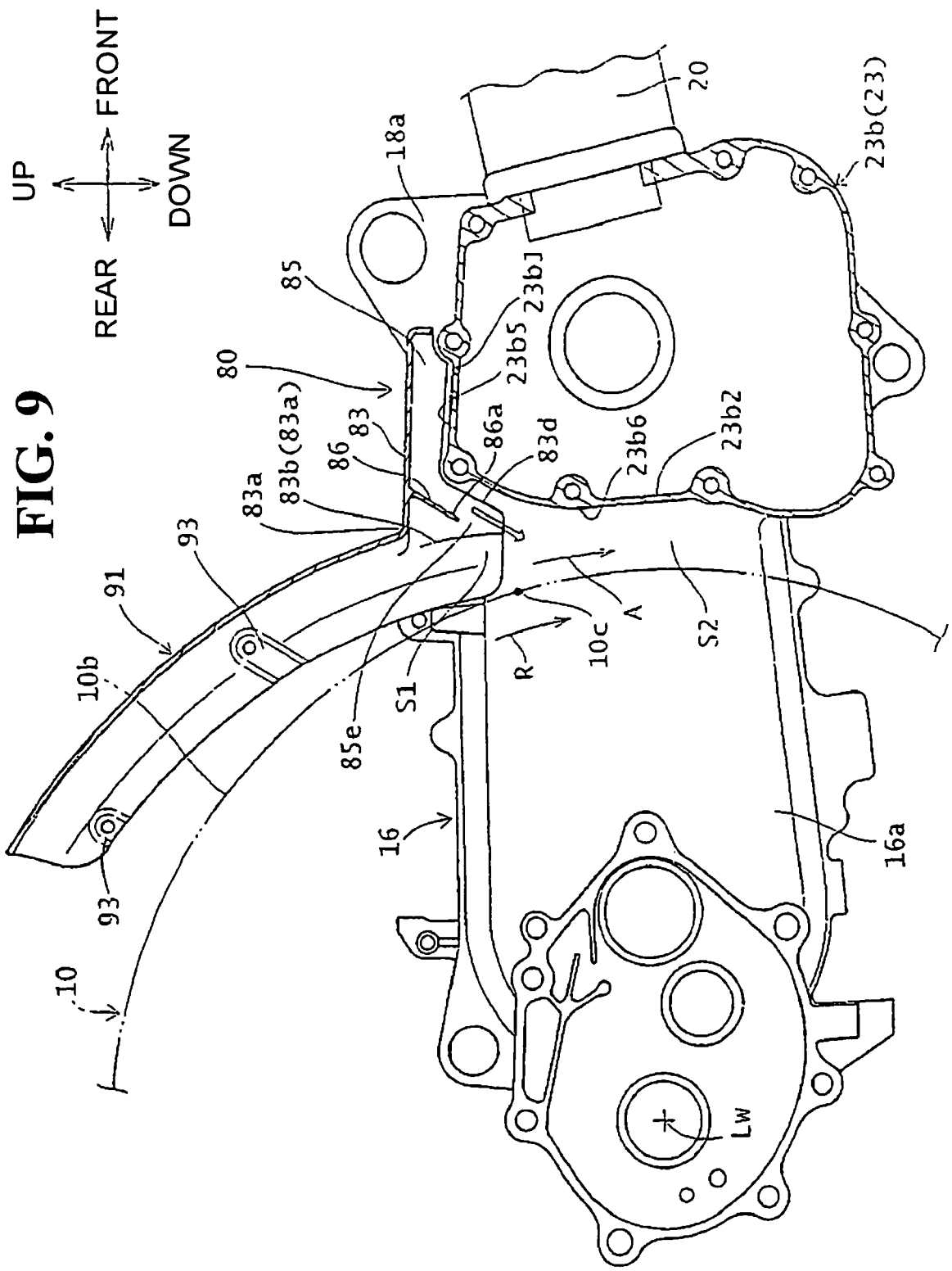
FIG. 9 is a cross sectional view of the main parts taken along line IX-IX of FIG. 8.

With reference to FIG. 7 to 9, the wind exhaust duct 80 is configured by an upstream duct part 81 forming the wind exhaust inlet portion 85i opening towards the right at the exhausted guiding portion (similar to exhausted wind guiding portion 54i of the first embodiment) of the shroud 54, a downstream duct part 83 coupled to the fender 91 at the downstream end 83a and forming the wind exhaust outlet portion 85e, and a bent duct part 82 for connecting the upstream duct part 81 and the downstream duct part 83, thereby forming a bent wind exhaust path 85.

The wind exhaust duct 80 linearly extends towards the left substantially parallel to the left and right direction at the upstream duct part 81 with the wind exhaust path 85 extending from the wind exhaust inlet portion 85i towards the wind exhaust outlet portion 85e, bends towards the rear at the bent duct part 82, and then linearly extends towards the rear at the downstream duct part 83 substantially parallel to the front and back direction, and thus has an L-shaped part when seen in the up and down direction (i.e., in plan view).

In the present embodiment, the wind exhaust duct 80 is a cover shaped component that covers the crankcase 23 from the upper side and has a shape in lateral cross section of a horseshoe shape with respect to the flow of the exhausted wind, and is opened to each half case 23a, 23b and towards the lower side. The wind exhaust duct 80 forms the wind exhaust path 85 in cooperation with each half case 23a, 23b. The exhausted wind thus contacts each half case 23a, 23b and flows through the wind exhaust path 85, whereby the crankcase 23 is cooled by the exhausted wind. The downward duct part 83 includes an upper wall 83c and a pair of side walls 83d connecting to the upper wall 83c and lying in the left and right direction.

The wind exhaust duct 80 may be a tubular component so that only the wind exhaust duct 80 forms the wind exhaust path 85.

The wind exhaust outlet portion 85e has at least one part formed by a coupling portion 83b (downstream end 83a in the present embodiment) in a region coupled to the inner fender 91 at the downstream duct part 83. In the present embodiment, the wind exhaust outlet portion 85e is formed by the coupling portion 83b to the fender 91 in each side wall 83d, the half cases 23a, 23b, and a distal end portion 86a of a shielding part 86, to be hereinafter described. The wind exhaust outlet portion 85e is an opening formed in the inner fender 91 itself that opens at a position facing a tread 10b of a tire 10a of the rear wheel 10 in the radial direction, and arranged at a portion covering the rear wheel 10 from the front or from diagonally above from the front at the inner fender 91.

The wind exhaust outlet portion 85e opens to an inner space S1, which is a space formed between the rear wheel 10 and the inner fender 91 in the radial direction. Therefore, the exhausted wind of the wind exhaust duct 80 is exhausted to the inner space S1 formed radially inward with respect to the inner fender 91 using the wind exhaust outlet portion 85e or through the wind exhaust outlet portion 85e. The exhausted wind is exhausted from the wind exhaust outlet portion 85e in a direction of a rotating direction R at a region 10c (region 10c is part of the tread 10b of the tire 10a) closest to the wind exhaust outlet portion 85e in the rear wheel 10 and diagonally downward towards the rear. In FIG. 9, the outline of the flow of the exhausted wind is shown with an outlined arrow.

The direction of the rotating direction R means that the exhausted wind includes flow components in the direction same as the direction of the rim speed of the rear wheel 10 at the region 10c. The rotating direction R of the rear wheel 10 is the rotating direction of when the motorcycle 1 moves forward.

Most of the wind exhaust outlet portion 85e is positioned below the upper faces 23a5, 23b5, 23a6, 23b6 of the crankcase and the upper face 16d of the transmission case 16 (see also FIG. 6), and is positioned in a space having the front side shielded by the crank case 23 and the left direction shielded by the transmission case 16, and furthermore, the exhausted wind exhausted from the wind exhaust outlet portion 85e is reliably prevented from being taken in from the air intake portion 16c of the transmission case 16 since the exhausted wind is exhausted downward from the wind exhaust outlet portion 85e.

The shielding part 86 is arranged on the downstream duct part 83 to suppress foreign materials taken up by the rear wheel 10 or foreign materials such as small rocks, dirt, and dust that were attached to the tread 10b and scattered by centrifugal force from entering inside the wind exhaust duct 80 or the wind exhaust path 85. The shielding part 86 prevents the foreign materials from being scattered over the shielding part 86, and thus is a portion that also has the function of the fender 91, whereby the wind exhaust duct 80 arranged with the shielding part 86 also serves as the fender 91.

The shielding part 86 is a canopy part or canopy shaped wall extending in a direction of the rotating direction R at the region 10c or diagonally downward at the rear from the upper wall 83c in the coupling portion 83b or in the vicinity of the coupling portion 83b.

The shielding part 86 is integrally coupled and arranged with the downstream duct part 83 by being integrally molded with the downstream duct part 83. Furthermore, the shielding part 86 is connected to the sidewalls 83d and is arranged across the entire width of the downstream duct part 83 or the wind exhaust path 85 in the left and right direction. The wind exhaust outlet portion 85e is formed below the distal end portion 86a of the shielding part 86.

The shielding part 86 extends downward along the rear faces 23a6, 23b6 of the rear walls 23a2, 23b2 of the respective half cases 23a, 23b (see FIG. 9). Thus, the exhausted wind that flows in a substantially horizontal direction between the upper ends 23a1, 23b1 of each half case 23a, 23b and the wind exhaust duct 80 is deflected downward by the shielding part 86, and the exhausted wind that has been deflected flows out from the wind exhaust outlet portion 85e, and flows along the rear face 23a6, 23b6 of each half case 23a, 23b. The shielding part 86 thus also acts a deflecting part for deflecting the exhausted wind towards the wind exhaust outlet portion 85e.

The rear wall 23a2, 23b2 of each half cases 23a, 23b is at a position facing the tread 10b in the radial direction and in the front and back direction, and serves as a fender continuing from the inner fender 91 in the rotating direction R. The exhausted wind exhausted from the wind exhaust outlet portion 85e in the direction of the rotating direction R at the region 10c mostly flows through the inner space S1 and into an outer space S2 serving as a space formed between the rear walls 23a2, 23b2 and the rear wheel 10 in the radial direction and in the front and back direction. Airflow A in the direction of the rotating direction generated by the rotation of the rear wheel 10 exists in the outer space S2 due to flow resistance of air.

When the motorcycle 1 travels, the exhausted wind, which is the cooling wind passed through the radiator 52 and cooled the cooling water, flows into the wind exhaust duct 80 from the shroud 54, through the wind exhaust duct 80, and then exhausted in the direction of the rotating direction R at the region 10c in the inner space S1 and also downward from the wind exhaust outlet portion 85e at the rear of the crankcase 23, and furthermore, flows downward through the outer space S2 with the air flow A generated by the rotation of the rear wheel 10.

According to the second embodiment, in the motorcycle 1 mounted with the internal combustion engine E equipped with the cooling device 50 having the radiator 52 arranged lateral to the crankcase 32, the internal combustion engine E is supported by the body frame F in a swinging manner integrally with the rear wheel 10, the cooling device 50 includes the wind exhaust duct 80 for exhausting the exhausted wind, which is the cooling wind passed through the radiator 52, to the atmosphere from the wind exhaust outlet portion 85e, and the wind exhaust duct 80 is arranged at the upper ends 23a1, 23b1 of the crankcase 23 so that the motorcycle 1 is mounted with the internal combustion E, where the following effects are obtained in addition to the effects similar to the first embodiment since the wind exhaust duct 80 is arranged using the upper ends 23a1, 23b1 of the crankcase 23 in the motorcycle 1 where enhancement in the cooling performance of the radiator 52 by the traveling wind cannot be expected too much since the radiator 52 is arranged lateral to the crankcase 23.

The wind exhaust duct 80 is coupled with the inner fender 91 and the wind exhaust outlet portion 85e is formed by the coupling portion 83b to the inner fender 91 of the wind exhaust duct 80, so that the exhausted wind of the wind exhaust duct 80 is exhausted to the inner space S1 through the wind exhaust outlet portion 85e or the opening formed in the inner fender 91, whereby the exhausted wind from the wind exhaust outlet portion 85e is prevented from hitting the fender 91 thus inhibiting the exhaust of the exhausted wind, and furthermore, the wind exhaust duct 80 can be miniaturized and compact arrangement can be achieved since the wind exhaust duct 80 does not need to be arranged avoiding the inner fender 91. The wind exhaust duct 80 is integrally molded with the inner fender 91 thereby reducing the number of components.

The wind exhaust outlet portion 85e opens to the position facing the tread 10b of the rear wheel 10 in the radial direction, and the wind exhaust duct 80 or the inner fender 91 is arranged with the shielding part 86 for suppressing foreign materials taken up by the rear wheel 10 or foreign materials that were attached to the tread 10b and scattered by centrifugal force from entering into the wind exhaust duct 80, whereby exhaust of the exhausted wind from the wind exhaust outlet portion 85e is prevented or suppressed from being inhibited by foreign materials by the shielding part 86, and thus the flow of the exhausted wind in the wind exhaust duct 80 including the wind exhaust outlet portion 85e becomes smooth, which contributes to enhancing the cooling performance of the radiator 52.

The shielding part 86 extends along the rear faces 23a6, 23b6 or the outer surfaces of the crankcase 23, and thus the exhausted wind exhausted from the wind exhaust duct 80 flows along the rear faces 23a6, 23b6, whereby the contacting range of the rear faces 23a6, 23b6 and the exhausted wind increases and the cooling effect of the crankcase 23 by the exhausted wind enhances.

Since the air flow A in the direction substantially the same as the exhausting direction of the exhausted wind is generated by the rotation of the rear wheel 10 in the inner space S1 or the outer space S2 when the exhausted wind is exhausted from the wind exhaust outlet portion 85e in the direction of the rotating direction R at the region 10c closest to the wind exhaust outlet portion 85e in the rear wheel 10 to the inner space S1 between the rear wheel 10 and the inner fender 91 or the outer space S2 between the rear wheel 10 and the crankcase, the exhaust of the exhausted wind from the wind exhaust outlet portion 85e is promoted by using the air flow A, and thus the wind volume of the cooling wind that passes through the radiator 52 increases and the cooling performance of the radiator 52 enhances.

Figure 10:
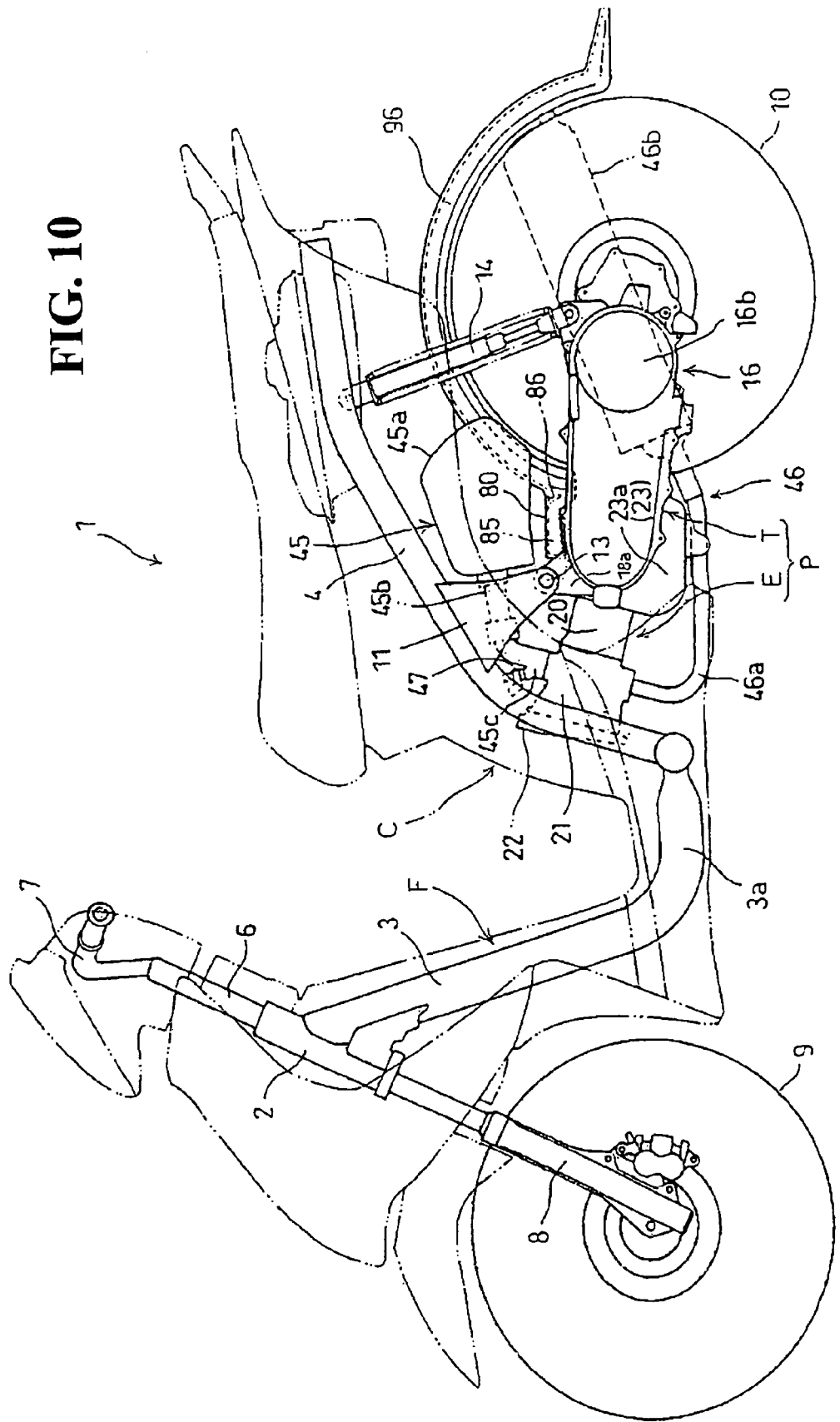
FIG. 10 is a view of a third embodiment of the present invention, corresponding to FIG. 1, showing a motorcycle mounted with a power unit including a water cooled internal combustion engine and a power transmission system.

The third embodiment of the present invention will now be described with reference to FIG. 10. The third embodiment differs from the second embodiment regarding the fender, but other configurations are basically the same. The description on the same component thus will be omitted or simplified, and the description will be made focusing on the different aspect. The same reference numerals are used, as necessary, for the members same as or members corresponding to the members of the second embodiment.

The motorcycle 10 includes one fender 96 that covers the rear wheel 10 from the front side towards the rear side and from the outer side in the radial direction. The fender 96 is a movable fender that can swing with respect to the body frame F integrally with the power unit P and the internal combustion engine E, and is attached and fixed to the crankcase and the transmission case 16 by way of a stay (not shown) serving as a fixing member. The fender 96 covers at least the rear wheel 10 from the front or from diagonally above from the front, similar to the inner fender 91 of the second embodiment.

Similar to the second embodiment, the wind exhaust duct 80 is a separate component from the crankcase 23, and is coupled with the fender 96 by being integrally molded with the fender 96. The shielding part 86 is integrally molded with the wind exhaust duct 80.

According to the third embodiment, effects similar to the second embodiment are obtained.

An embodiment in which the configuration of one part of the embodiment described above is modified will be described below regarding the modified configuration.

In the first embodiment, the wind exhaust duct 70 may be a separate component from the crankcase 23.

The wind outlet portion 54e does not need to be formed at the shroud 54.

An electrically operated motor may rotatably drive the cooling fan. The internal combustion engine may be a multi-cylinder internal combustion engine including a cylinder block configured by a plurality of integrally formed cylinders.

The internal combustion engine may be arranged in the internal combustion engine used in machines other than in vehicles such as a stationary type internal combustion engine. The internal combustion engine and the transmission may be supported while being fixed to the body frame.

The shielding part 86 may be arranged on the fenders 91, 96. The shielding part 86 may be a separate component from the fenders 91, 96 or the wind exhaust duct 80. The shielding part 86 may be arranged in the left and right direction with a spacing, or may be arranged at one part of the width of the downstream duct part 83 in the left and right direction.

The wind exhaust duct 80 and the fenders 91, 96 may be separate components, and integrally coupled by coupling means such as screw, welding, adhesive, etc. If the wind exhaust duct 80 and the fenders 91, 96 are separate components, they are arranged in a non-coupled state, so that the exhausted wind exhausted from the wind exhaust outlet portion 85e flows through the openings formed in the fender 91, 96 and into the inner space S1 of the fender 91.

Using the opening formed in the fender 91, 96, the downstream duct part 83 may be passed through the opening and coupled to the fenders 91, 69 at the region on the upstream side from the downstream end 83a or arranged with respect to the fenders 91, 96 so that the downstream end 83a of the downstream duct part 83 is positioned in the inner space S1.

When the wind exhaust outlet portion 85e opens to substantially immediately below, the shielding part 86 does not need to be arranged depending on the form of the wind exhaust outlet portion 85e.

Moreover, most of or all of the exhausted wind from the wind exhaust outlet portion 85e may be directly exhausted to the outer space S2 without passing through the internal space S1 depending on the positional relationship of the wind exhaust duct 80 and the fenders 91, 96. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine comprising:
   an engine main body configured by a crankcase; and
   a cooling device including a radiator arranged lateral to the engine main body, said cooling device including a wind exhaust duct for exhausting exhausted wind, which is cooling wind passed through the radiator, to an atmosphere,
   wherein the wind exhaust duct is arranged on an upper portion of the crankcase.

2. The internal combustion engine according to claim 1, wherein a power transmission system including a transmission case for accommodating a transmission is arranged on the side opposite to the radiator with the crankcase in between in a direction of a rotational axis of a crankshaft supported by the crankcase, and the wind exhaust duct extends along the rotational axis of the crankshaft and is positioned on the upper portion of the transmission case.

3. The internal combustion engine according to claim 2, wherein the internal combustion engine is supported by a body frame at supporting parts arranged at a lower portion of the crankcase.

4. The internal combustion engine according to claim 1, wherein the internal combustion engine is supported by a body frame at supporting parts arranged at a lower portion of the crankcase.

5. A vehicle with wheels, the vehicle comprising:
an internal combustion engine mounted thereon, the internal combustion engine including an engine main body configured by a crankcase, and a cooling device, the cooling device including:
a radiator arranged lateral to the engine main body;
a wind exhaust duct for exhausting exhausted wind, which is cooling wind passed through the radiator, from a wind exhaust outlet portion to an atmosphere,
wherein the wind exhaust duct is arranged on an upper portion of the crankcase.

6. The vehicle according to claim 5, further comprising:
a fender for covering the wheel from an outer side in a radial direction having a rotational axis of the wheel as a center,
wherein the exhausted wind is exhausted to a space formed between the wheel on an inner side in the radial direction and the fender using an opening formed in the fender.

7. The vehicle according to claim 6, wherein the wind exhaust outlet portion opens at a position facing a tread of the wheel in the radial direction, and a shielding part for suppressing foreign materials, that are taken up by the wheel or foreign materials that are attached to the tread and scattered by a centrifugal force, from entering inside the wind exhaust duct, the shielding part being arranged in the wind exhaust duct or the fender.

8. The vehicle according to claim 7, wherein the shielding part extends along an outer surface of the crankcase.

9. The vehicle according to claim 5, further comprising:
a fender for covering the wheel from an outer side in a radial direction having a rotational axis of the wheel as a center,
wherein the wind exhaust duct is coupled with the fender, and the wind exhaust outlet portion is formed by a coupling portion that couples the wind exhaust duct to the fender.

10. The vehicle according to claim 6, wherein the exhausted wind is exhausted from the wind exhaust outlet portion to a space formed between the wheel and the fender or to a space formed between the wheel and the crankcase in a rotating direction at a region closest to the wind exhaust outlet portion in the wheel.

11. The vehicle according to claim 9, wherein the exhausted wind is exhausted from the wind exhaust outlet portion to a space formed between the wheel and the fender or to a space formed between the wheel and the crankcase in a rotating direction at a region closest to the wind exhaust outlet portion in the wheel.

12. The vehicle according to claim 5, wherein the wind exhaust outlet portion opens at a position facing a tread of the wheel in the radial direction, and a shielding part for suppressing foreign materials, that are taken up by the wheel or foreign materials that are attached to the tread and scattered by a centrifugal force, from entering inside the wind exhaust duct, the shielding part being arranged in the wind exhaust duct or the fender.

13. The vehicle according to claim 12, wherein the shielding part extends along an outer surface of the crankcase.

14. The vehicle according to claim 12, wherein the exhausted wind is exhausted from the wind exhaust outlet portion to a space formed between the wheel and the fender or to a space formed between the wheel and the crankcase in a rotating direction at a region closest to the wind exhaust outlet portion in the wheel.

15. The vehicle according to claim 5, wherein the exhausted wind is exhausted from the wind exhaust outlet portion to a space formed between the wheel and the fender or to a space formed between the wheel and the crankcase in a rotating direction at a region closest to the wind exhaust outlet portion in the wheel.

* * * * *